United States Patent Office 3,787,364
Patented Jan. 22, 1974

3,787,364
PROCESS FOR MAKING POLYETHERIMIDES
Joseph G. Wirth and Darrell R. Heath, Schenectady, N.Y., assignors to General Electric Company
No Drawing. Filed Sept. 1, 1971, Ser. No. 177,165
Int. Cl. C08g 20/32, 23/00
U.S. Cl. 260—61                    13 Claims

ABSTRACT OF THE DISCLOSURE

Polyetherimides are prepared from the reaction of a bis(chlorophthalimide) with an alkali metal salt of a divalent carbocyclic aromatic radical in the presence of an appropriate solvent.

---

Recent interest in heat-resistant polymers has led to the development of polyimides. These polymers incorporate the imide group in the polymer main chain and are prepared from aromatic acids. Such aromatic polyimides are useful in making films, moldings and wire enamels. A comprehensive review of polyimides including their preparation, properties and applications is set forth in the Encyclopedia of Polymer Science and Technology, vol. 11, pages 247–272 (1969). The reference discloses the preparation of polyimides from aliphatic diamines and aromatic tetracarboxylic acids or from aromatic diamines and aromatic dianhydrides.

In our copending application Ser. No. 177,164, filed even date herewith, we have disclosed a process for preparing polyetherimides by copolymerizing bis(nitrophthalimides) with a divalent carbocyclic aromatic radical. The polyetherimides formed by that process are useful in making films, moldings and wire enamels having heat resistant properties.

The polyetherimides disclosed in our copending application broadly have the general formula:

(I)

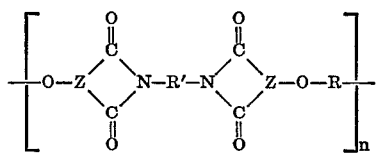

wherein $$-O-Z\Big\langle$$

is defined as a member selected from the group consisting of (a)

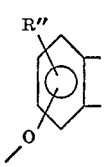

wherein R″ can be hydrogen, lower alkyl or lower alkoxy, (b)

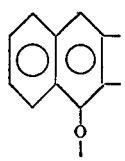

and (c)

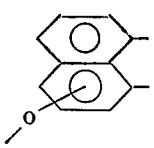

wherein the oxygen may be attached to either ring and located ortho or para to one of the bonds to the anhydride carbonyl groups; and R, R′ and n are defined hereinbelow. A preferred family of the generic group are polyetherimides having the formula:

(II)

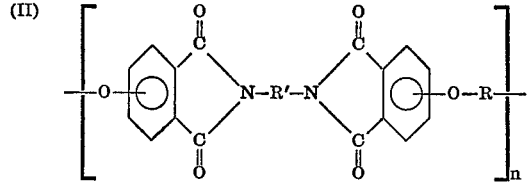

wherein R is a divalent aromatic radical containing from 6–20 carbon atoms, R′ is a divalent radical which is the organic residue of a diamine reacted with a nitro-substituted aromatic anhydride and n is an integer having a value greater than 1, for instance, from 2 to as high as 5,000 or more. More specifically, R can be a member selected from the group consisting of phenylene, lower alkylphenylene,

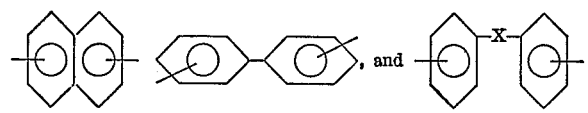

wherein X is a member selected from the group consisting of bivalent aliphatic, cycloaliphatic, or araliphatic (having 1–8 carbon atoms),

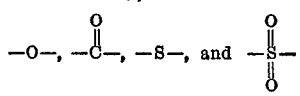

and R′ is a member selected from the group consisting of R, xylylene, alkylene containing 2–20 carbon atoms and cycloalkylene.

In accordance with the present invention, we have discovered an alternative process for making the polyetherimides, as illustrated by the preferred family of the generic group, which comprises effecting reaction in the presence of a dipolar aprotic solvent of a mixture of ingredients comprising (1) a bis(chlorophthalimide) of the general formula:

(III)

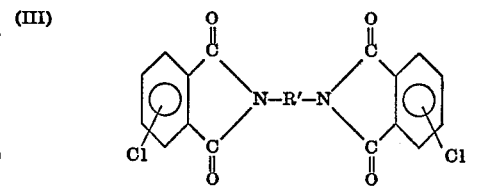

wherein R′ is defined as hereinabove, and (2) an alkali metal salt of an organic compound of the general formula:

(IV)                MO—R—OM wherein M is an alkali metal and R is defined as hereinabove.

The bis(chlorophthalimide) used in preparing the polymer is formed by reacting a diamine of the formula:

(V)                NH$_2$—R′—NH$_2$ wherein R′ is defined as hereinabove with a chloro-substituted aromatic anhydride of the formula:

(VI)

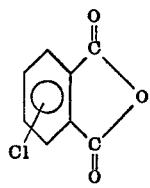

The molar ratio of diamine to anhydride should ideally be about 1:2 respectively. The initial reaction product is a bis(amide-acid) which is subsequently dehydrated to the corresponding bis(chlorophthalimide).

The diamines of Formula V above are described in the prior art and are to a large extent commercially available materials. Typical of such diamines from which the bis(chlorophthalimides) may be prepared are the following:

m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;

and mixtures thereof. It should be noted that these diamines are given merely for the purpose of illustration and are not considered to be all inclusive. Other diamines not mentioned will readily be apparent to those skilled in the art.

The preferred chlorophthalic anhydrides useful in the present invention are 3-chlorophthalic anhydride, 4-chlorophthalic anhydride and mixtures thereof. These reactants may be prepared by the chlorination of phthalic anhydride using procedures described in U.S. Pats. 2,028,383 and 2,547,505; also other procedures known in the art may also be used, e.g. Zh. Obs. Khim, 20, 469 (1950). Certain other closely related chloroaromatic anhydrides may also be used in the reaction and are illustrated for example by 2-chloronaphthalic anhydride, 4-chloronaphthalic anhydride, 1-chloro-2,3-naphthalenedicarboxylic anhydride and 3-methoxy-6-chlorophthalic anhydride.

With reference to the alkali metal salts of Formula IV, among the divalent carbocyclic aromatic radicals which R may represent (mixtures of such radicals are also included) are, for instance, divalent aromatic hydrocarbon radicals of from 6 to 20 carbon atoms, such as, phenylene, biphenylene, naphthylene, etc. Included are residues of, e.g., hydroquinone, resorcinol, chlorohydroquinone, etc. In addition, R may be a residue of a dihydroxy diarylene compound in which the aryl nuclei are joined by either an aliphatic group, a sulfoxide group, sulfonyl group, sulfur, carbonyl group, oxygen, the

—C(CH$_3$)(CH$_2$)$_2$(COOH)— group, etc. Typical of such diarylene compounds are the following:

2,4'-dihydroxydiphenylmethane;
bis(2-hydroxyphenyl)methane;
2,2-bis(4-hydroxyphenyl)propane hereinafter identified as "Bisphenol-A" or "BPA";
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,2-bis(4-hydroxyphenyl)ethane;
1,1-bis(4-hydroxy-2-chlorophenyl)ethane;
1,1-bis(2,5-dimethyl-4-hydroxyphenyl)ethane;
1,3-bis(3-methyl-4-hydroxyphenyl)propane;
2,2-bis(3-phenyl-4-hydroxyphenyl)propane;
2,2-bis(3-isopropyl-4-hydroxyphenyl)propane;
2,2-bis(4-hydroxynaphthyl)propane;
2,2-bis(4-hydroxyphenyl)pentane;
3,3-bis(4-hydroxyphenyl)pentane;
2,2-bis(4-hydroxyphenyl)heptane;
bis(4-hydroxyphenyl)phenylmethane;
bis(4-hydroxyphenyl)-cyclohexylmethane;
1,2-bis(4-hydroxyphenyl)-1,2-bis(phenyl)propane;
2,2-bis(4-hydroxyphenyl)-1-phenylpropane;
2,4-dihydroxybenzophenone;
4,4'-dihydroxydiphenyl sulfone;
2,4'-dihydroxydiphenyl sulfone;
5'-chloro-2,4'-dihydroxydiphenyl sulfone;
3'-chloro-4,4'-dihydroxydiphenyl sulfone;
4,4'-dihydroxytriphenyl disulfone;
4,4'-dihydroxydiphenyl ether;
4,4'-dihydroxydiphenyl sulfide;
4,4'-dihydroxy-o-biphenyl ether;
the 4,3'-, 4,2'-, 4,1'-, 2,2'-, 2,3'-, etc. dihydroxydiphenyl ethers;
4,4'-dihydroxybenzophenone;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
2-methyl-2-carboxyethyl-bis(4-hydroxyphenyl)propane;
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether;

etc., dihydric phenols substituted on the aryl nucleus with alkyl, alkenyl, cycloaliphatic, cycloalkenyl, aryl, alkaryl, numerous examples of which have been given above, as well as the dihydroxy toluenes, the dihydroxy xylenes, dihydroxy pyridines, dihydroxy anthraquinones, dihydroxy benzoic acids, other benzophenones, etc.

The R radical can have many inert substituents on the aryl nuclei as recited above, for instance, monovalent hydrocarbon radicals such as methyl, ethyl, cycloaliphatic radicals (for instance, cyclopentyl, cyclohexyl, etc.), etc.; aryl radicals, e.g., phenyl, biphenyl, etc., radicals; alkaryl radicals, e.g., tolyl, ethylphenyl, etc., radicals; aralkyl radicals, e.g., benzyl, phenylethyl, etc., radicals.

The means, whereby the process of the present invention may be practiced and polymeric compositions herein defined obtained, can be varied widely. When dialkali metal salts of Formula IV are used with the compound illustrated by Formula III, the ingredients are advantageously present in an equal molar ratio for optimum molecular weight and properties of the polymer. Slight molar excesses, e.g., about 0.001 to 0.01 molar excess of either the dichloro-substituted organic compound or of the dialkali metal salt of Formula IV may be employed without departing from the scope of the invention for molecular weight control.

In making the alkali metal salts of Formula IV, it is sometimes advantageous to preform these salts by reacting the corresponding dihydroxy organic compound with an alkali-metal hydroxide such as sodium hydroxide, potassium hydroxide, etc. For instance, the dialkali metal salt of Bisphenol A may be obtained by reacting 2 moles of sodium hydroxide per mole of Bisphenol A. Persons skilled in the art will have no difficulty in determining how to make the alkali metal salts of Formula IV for use with the dichloro-substituted organic compound of Formula III.

The conditions of reaction whereby the alkali metal salt of Formula IV is reacted with the dichloro-substituted organic compound of Formula III can be varied widely. Generally, temperatures of the order of about 25–150° C. are advantageously employed, although it is possible to employ lower or higher temperature conditions depending on the ingredients used, the reaction product sought, time of reaction, solvent employed, etc. In addition to atmospheric pressure, superatmospheric pressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 5 minutes to as much as 30 to 40 hours are advantageously employed to obtain the maximum yield. Thereafter the reaction product can be treated in the manner required to effect precipitation and/or separation of the desired polymeric reaction product. Generally, common solvents such as alcohols (e.g. methanol, ethanol, isopropyl alcohol, etc.) and aliphatic hydrocarbons (e.g. pentane, hexane, octane, cyclohexane, etc.) may be employed for the purpose.

It is important that the reaction between the dichloro-substituted organic compound of Formula III and the alkali metal salt of Formula IV (mixtures of such alkali metal salts can also be used) be carried out in the presence of a dipolar aprotic solvent. The term "dipolar aprotic solvent" is intended to mean any organic solvent which has no active protons which may interfere with the reaction herein described. Also, mixtures of dipolar aprotic solvents with other aromatic solvents, such as benzene, toluene and xylene, may be used.

Among the preferred dipolar aprotic solvents which may be employed in the practice of this invention are non-acid, oxygen-containing, nitrogen-containing organic solvents. These include but are not limited to, for instance, N,N-dimethylacetamide, N-methylpyrrolidone, N,N-dimethylformamide, dimethylsulfoxide, hexamethylphosphoramide, etc.

The amount of solvent used in the reaction mixture may be varied widely. Generally, on a weight basis, one can employ from 0.5 to 50 or more parts of the solvent per part of total weight of the reactants, namely, the dichloro-substituted organic compound of Formula III and the alkali metal salt of Formula IV. The amount of solvent is not critical, but generally we have found that on a weight basis one can employ from 2 to 20 parts of the solvent per part of the total weight of the dichloro-substituted organic compound and the alkali metal salt, whether the latter is preformed or prepared in situ.

Thus, as an illustration, the dianion of a bisphenol is prepared and maintained in a nitrogen atmosphere using an alkali metal hydroxide (1.000 mole bisphenol to 2.000 mole hydroxide) as an aqueous solution. Water is then removed by azeotropic distillation with an appropriate solvent, e.g. benzene. The polymerization is performed under anhydrous conditions usually using dipolar aprotic solvents, such as dimethylsulfoxide, which are added in varying amounts depending upon the particular polymerization. A total quantity of solvent, dipolar aprotic solvent or mixture of such solvent with an aromatic solvent sufficient to give a final solution containing 10–20% by weight of polymer is preferably employed.

When the dianion is completely anhydrous, the bischlorophthalimide is added with stirring and polymerization takes place. After reaction at a sufficient temperature and for a sufficient time, the polymer solution is allowed to cool to room temperature and a few drops of acetic acid or acetic anhydride are added to discharge the residual color. The polymer is isolated by precipitating in methanol, washing in methanol, filtering and drying in a vacuum oven to give a yield of 80–100%.

In order that those skilled in the art may better understand how the present invention may be practiced, the following examples are given by way of illustration and not by way of limitation. Unless otherwise stated, all parts are by weight.

EXAMPLE I

Preparation of 4,4'-bis(3-chlorophthalimido) diphenylmethane

A mixture of 18.25 g. (0.1 mole) 3-chlorophthalic anhydride, 9.9 g. (0.05 mole) 4,4'-diaminodiphenylmethane, and 200 ml. of glacial acetic acid was stirred at reflux for 17 hours. The mixture was cooled and the product was isolated by filtration, washed with ethyl ether, and recrystallized from chlorobenzene/heptane. The recrystallized product was filtered and dried "in vacuo" at 110° C. to give 24.0 g. (91% yield) of yellow granules which melted at 239–241° C.

*Analysis.*—Calculated for $C_{29}H_{16}Cl_2N_2O_4$ (percent): C, 66.0; H, 3.0; N, 5.3; Cl, 13.5. Found (percent): C, 66.4; H, 3.2; N, 5.1; Cl, 13.6.

EXAMPLE II

Preparation of 1,6-bis(3-chlorophthalimido)hexane

A mixture of 18.25 g. (0.1 mole) 3-chlorophthalic anhydride, 5.8 g. (0.05 mole) 1,6-diaminohexane, and 200 ml. glacial acetic acid was stirred at reflux for 3 days. After adding 25 g. of acetic anhydride, the mixture was stirred for an additional two hours at reflux and cooled. The product was isolated by filtration to give 17.7 g. (79.4% yield). Recrystallization of the crude product from benzene gave colorless crystals melting at 187–188° C.

*Analysis.*—Calculated for $C_{22}H_{18}Cl_2N_2O_4$ (percent): C, 59.3; H, 4.0; N, 6.3; Cl, 16.0. Found (percent): C, 59.7; H, 4.2; N, 6.6; Cl, 15.5.

EXAMPLE III

Preparation of 4,4'-bis(4-chlorophthalimido)diphenyl ether

A mixture of 14.0 g. (0.077 mole) 4-chlorophthalic anhydride, 7.67 g. (0.038 mole) 4,4'-diaminodiphenyl ether and 100 ml. glacial acetic acid was heated overnight under reflux and then allowed to cool to room temperature. The orange solid was collected on a filter, washed with acetic acid and dried overnight in a vacuum oven at 80° C./15–20 mm. M.P. 238–240° C. Yield 17.86 g. (89%). The expected structure of 4,4'-bis(4-chlorophthalimido)diphenyl ether was confirmed by its infrared spectrum and the following analysis:

*Analysis.*—Calculated for $C_{28}H_{14}Cl_2N_2O_5$: (percent): C, 63.5; H, 2.7; N, 5.3. Found (percent): C, 63.2; H, 2.7; N, 5.4.

EXAMPLE IV

Preparation of 1,6-bis(4-chlorophthalimido)hexane

To a solution of 4.45 g. (0.0384 mole) 1,6-diaminohexane in 100 ml. glacial acetic acid was added 14.0 g. (0.0767 mole) 4-chlorophthalic anhydride. The resulting solution was heated overnight under reflux and then allowed to cool to room temperature. The white precipitate was collected on a filter and dried overnight in a vacuum oven at 80° C./15-20 mm. M.P. 206-209° C. Yield 14.28 g. (84%). The infrared spectrum and the following analysis were consistent with 1,6-bis(4-chlorophthalimido)hexane:

*Analysis.*—Calculated for $C_{22}H_{18}Cl_2N_2O_4$ (percent): C, 59.3; H, 4.1; N, 6.3. Found (percent): C, 58.7; H, 3.9; N, 6.1.

EXAMPLE V

Preparation of 4,4'-bis(4-chlorophthalimido) diphenyl methane

A mixture of 10.0 g. (0.0548 mole) 4-chlorophthalic anhydride, 5.43 g. (0.0274 mole) methylene dianiline and 85 ml. acetic acid was heated overnight under reflux. The reaction mixture was cooled to room temperature and the solid product collected on a filter and oven dried. Yield 12.4 g. (96%). M.P. 253-255° C. The infrared spectrum and the following analysis were consistent with 4,4'-bis(4-chlorophthalimido)diphenyl methane:

*Analysis.*—Calculated for $C_{29}H_{14}Cl_2N_2O_4$ (percent): C, 66.0; H, 3.1; N, 5.3. Found (percent): C, 65.4; H, 3.1; N, 5.2.

EXAMPLE VI

Preparation of polyetherimide from 4,4'-bis(3-chlorophthalimido)diphenylmethane and Bisphenol A A mixture of 2.2828 g. (0.01 mole) Bisphenol A, 0.8 g. (1.5904 g. 50.3% aqueous solution, 0.02 mole) sodium hydroxide, 20 ml. dimethylsulfoxide, and 5 ml. benzene was stirred under a nitrogen atmosphere at reflux over a Dean Stark trap for 4 hours and the benzene was distilled. The mixture was cooled to 40° C. and 5.2736 g. (0.01 mole) 4,4'-bis(3-chlorophthalimido)diphenylmethane and 30 ml. dry dimethylsulfoxide were added. The reaction mixture was stirred for 10 minutes at 40° C. and then for 18 hours at 85° C. After cooling to 60° C., 1 ml. of acetic anhydride was added and the mixture was poured into methanol. The product was isolated by filtration, washed with methanol, and dried "in vacuo" at 110° C. to give 6.2 g. (91% yield) of off-white powder. The crude product was dissolved in methylene chloride and precipitated in methanol to give a fine white powdery polymer, I.V. ($CH_2Cl_2$) 0.08; Tg, 174° C.; TGA (air) 400° C.

*Analysis.*—Calculated for $(C_{44}H_{30}N_2O_6)_n$ (percent): C, 77.4; H, 4.4; N, 4.0. Found (percent): C, 77.3; H, 4.6; N, 4.2.

EXAMPLE VII

Preparation of polyetherimide from 1,6-bis(3-chlorophthalimido)hexane and Bisphenol A A mixture of 2.2828 g. (0.01 mole) Bisphenol A, 0.8 g. (1.5904 g. 50.3% aqueous solution, 0.02 mole) sodium hydroxide, 20 ml. dimethylsulfoxide, and 5 ml. benzene was stirred under a nitrogen atmosphere at reflux over a Dean Stark trap for 5 hours and the benzene was distilled. The mixture was cooled to 45° C. and 4.4529 g. (0.01 mole) 1,6-bis(3-chlorophthalimido)hexane and 30 ml. dry dimethylsulfoxide were added and the solution was stirred at 70° C. for 65 hours. Three drops of glacial acetic acid were added and the reaction mixture was added to methanol. The product was isolated by filtration, washed with methanol and water, and dried "in vacuo" at 110° C. to give a fine white granular powder. I.V. ($CH_2Cl_2$) 0.12; TGA (air) 400° C.

EXAMPLE VIII

Preparation of polyetherimide from 4,4'-bis(4-chlorophthalimido)diphenylether

The dianion was prepared in the usual manner from 1.702 g. (7.457 mmol) Bisphenol A and 1.186 g. (50.3% aqueous solution, 14.914 mmol) sodium hydroxide in 25 ml. DMSO. Benzene was added and water removed by azeotropic distillation. When the system was anhydrous, benzene was distilled out and the DMSO solution was allowed to cool to 100° C. After adding 3.947 g. (7.457 mmol) 4,4' - bis(4 - chlorophthalimido)diphenylether the reaction mixture was heated overnight at 100–105° C. A few drops of acetic acid were added after the reaction mixture was cooled to room temperature and the polymer was precipitated by pouring into a large volume of methanol. The polymer was washed with methanol and dried overnight at 60° C./15-20 minutes. Wt. 4.57 g. (91%). I.V. (DMF) 0.21.

In order that those skilled in the art may better understand how the present invention may be practiced, the following examples are given by way of illustration and not by way of limitation. Unless otherwise stated, all parts are by weight.

We claim:
1. A method of making a polyetherimide comprising effecting reaction under anhydrous conditions in the presence of a dipolar aprotic solvent of a mixture of ingredients comprising
   (1) a salt of an organic compound of the general formula:

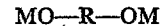

MO—R—OM wherein M is an alkali metal and R is a divalent carbocyclic aromatic radical containing from 6 to 20 carbon atoms; and
   (2) a dichloro-substituted aromatic compound of the general formula:

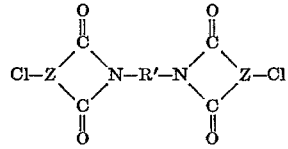

wherein R' is a divalent radical which is the organic residue of a diamine reacted with a chloro-substituted aromatic anhydride, and Cl—Z< is defined as a member selected from the group consisting of (a) 

wherein R" can be hydrogen, lower alkyl or lower alkoxy, (b) 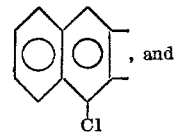, and (c) 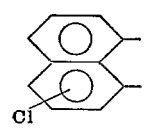

and wherein the Cl may be attached to either ring and located ortho or para to one of the bonds to the anhydride carbonyl groups.

2. A method of making a polyetherimide comprising effecting reaction under anhydrous conditions in the presence of a dipolar aprotic solvent of a mixture of ingredients comprising
(1) a salt of an organic compound of the general formula:

MO—R—OM wherein M is an alkali metal and R is a member selected from the group consisting of phenylene, lower alkylphenylene,

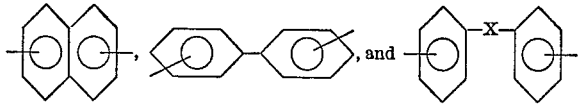

wherein X is a member selected from the group consisting of bivalent aliphatic, cycloaliphatic, or araliphatic (having 1-8 carbon atoms),

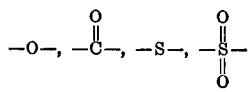

and
(2) a dichloro-substituted aromatic compound of the general formula:

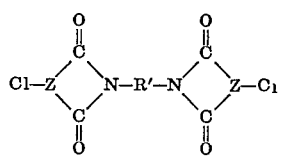

wherein R' is a member selected from the group consisting of R, xylylene, alkylene containing from 2-20 carbon atoms, cycloalkylene, bis(4-cycloalkyl) lower alkylene, and alkylcycloalkylene, and Cl—Z< is defined as a member selected from the group consisting of (a) 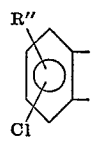

wherein R'' can be hydrogen, lower alkyl or lower alkoxy, (b) 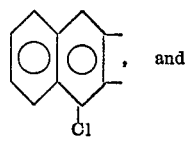, and (c) 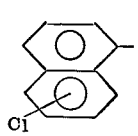

and wherein the Cl may be attached to either ring and located ortho or para to one of the bonds to the anhydride carbonyl groups.

3. A method of making a polyetherimide comprising effecting reaction under anhydrous conditions in the presence of a dipolar aprotic solvent of a mixture of ingredients comprising
(1) a salt of an organic compound of the general formula:

MO—R—OM wherein M is an alkali metal and R is a divalent carbocyclic aromatic radical containing from 6 to 20 carbon atoms; and
(2) a dichloro-substituted aromatic compound of the general formula:

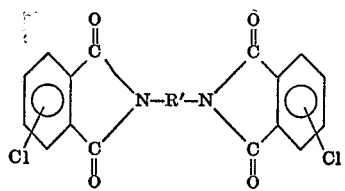

wherein R' is a divalent radical which is the residuum of a diamine reacted with a chloro-substituted aromatic anhydride.

4. A method of making a polyetherimide comprising effecting reaction under anhydrous conditions in the presence of a dipolar aprotic solvent of a mixture of ingredients comprising
(1) a salt of an organic compound of the general formula:

MO—R—OM wherein M is an alkali metal and R is a member selected from the group consisting of phenylene, lower alkylphenylene,

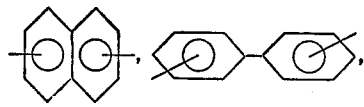

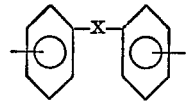

wherein X is a member selected from the group consisting of bivalent aliphatic, cycloaliphatic or araliphatic (having 1-8 carbon atoms),

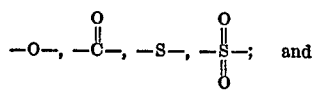

(2) a dichloro-substituted aromatic compound of the general formula:

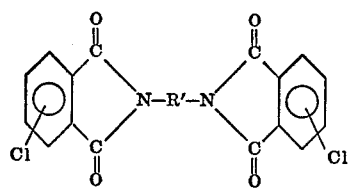

wherein R' is a member selected from the group consisting of R, xylylene, alkylene containing from 2-20 carbon atoms, cycloalkylene, bis(4-cycloalkyl) lower alkylene, and alkylcycloalkylene.

5. The method of claim 4, wherein the dichlorosubstituted aromatic compound has the general formula:

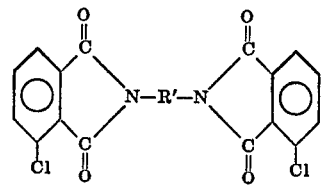

and R' is defined hereinabove.

6. The method of claim 4, wherein the dichloro-substituted aromatic compound has the general formula:

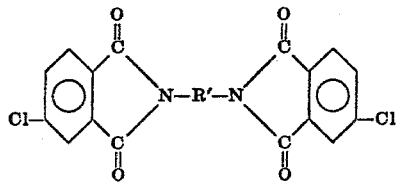

and R' is defined hereinabove.

7. The method of claim 4, wherein said dipolar aprotic solvent is a member selected from the group consisting of N,N-dimethylacetamide, N-methylpyrrolidone, N,N-dimethylformamide, dimethylsulfoxide, hexamehtylphosphoramide, N,N-diethylformamide, N,N-diethylacetamide, and tetramethylene sulfone.

8. The method of claim 7, wherein said solvent is dimethylsulfoxide.

9. The method of claim 7, wherein said dipolar aprotic solvent is mixed with an inert organic cosolvent selected from the group consisting of benzene, toluene, xylene and chlorobenzene.

10. The method of claim 4, wherein the polymerization reaction is effected under anhydrous conditions in an inert atmosphere, for a time and at a temperature sufficient to provide said polyetherimide.

11. The method of claim 10, wherein said time is about 5 minutes to 40 hours and said temperature is about 25°–150° C.

12. The method of claim 10, wherein M is sodium, R is

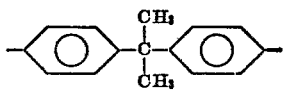

and the dichloro-substituted aromatic compound is

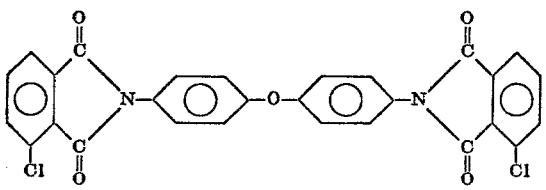

13. The method of claim 10, wherein M is sodium, R is

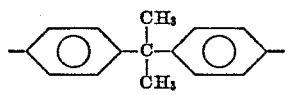

and the dichloro-substituted aromatic compound is

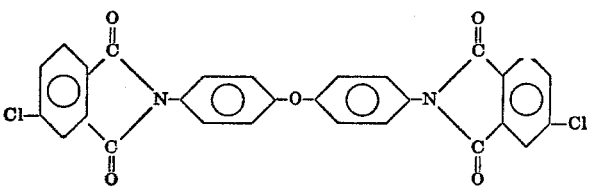

References Cited
FOREIGN PATENTS
1,078,234  8/1967  Great Britain.

MELVIN GOLDSTEIN, Primary Examiner

U.S. Cl. X.R.
260—47 CP